United States Patent
Zhang et al.

(10) Patent No.: US 8,775,606 B2
(45) Date of Patent: Jul. 8, 2014

(54) SYSTEM AND METHOD FOR COUNTING NETWORK USERS

(75) Inventors: Liang Zhang, Santa Clara, CA (US); Anirban Dasgupta, Albany, CA (US); Belle L. Tseng, Cupertino, CA (US); Benjamin Graham, Sunnyvale, CA (US); Arun A. Prakash, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 259 days.

(21) Appl. No.: 12/959,069

(22) Filed: Dec. 2, 2010

(65) Prior Publication Data

US 2012/0144016 A1 Jun. 7, 2012

(51) Int. Cl.
*G06F 15/173* (2006.01)

(52) U.S. Cl.
USPC .......................................... 709/224

(58) Field of Classification Search
USPC ........... 709/220, 229, 224; 705/14.25; 707/10
See application file for complete search history.

(56) References Cited

U.S. PATENT DOCUMENTS

| | | | |
|---|---|---|---|
| 2003/0131081 A1* | 7/2003 | Nareddy et al. | 709/220 |
| 2004/0243704 A1* | 12/2004 | Botelho et al. | 709/224 |
| 2008/0235243 A1* | 9/2008 | Lee et al. | 707/10 |
| 2008/0294630 A1* | 11/2008 | Yan et al. | 707/5 |
| 2009/0193129 A1* | 7/2009 | Agarwal et al. | 709/229 |
| 2010/0161785 A1* | 6/2010 | Xue et al. | 709/224 |
| 2010/0228850 A1* | 9/2010 | Fomitchev | 709/224 |
| 2011/0238476 A1* | 9/2011 | Carr et al. | 705/14.25 |
| 2011/0246641 A1* | 10/2011 | Pugh et al. | 709/224 |
| 2012/0054821 A1* | 3/2012 | Roy et al. | 726/1 |

* cited by examiner

*Primary Examiner* — Chi Pham
*Assistant Examiner* — Fahmida Chowdhury
(74) *Attorney, Agent, or Firm* — Berkeley Law & Technology Group, LLP

(57) ABSTRACT

Embodiments presented herein provide methods, systems and computer program products for determining a count of network users. One method identifies one or more login access requests, from one or more server logs. Each of the one or more login access requests comprises a login cookie, and a user identifier. The method then forms one or more connected components based on the one or more login access requests. Each connected component comprises one or more user identifiers, wherein each of the one or more user identifiers is associated with one or more login cookies. The method finally determines a count of login users based, at least in part, on the user identifiers in the one or more connected components.

20 Claims, 6 Drawing Sheets

SYSTEM AND METHOD FOR COUNTING NETWORK USERS

TECHNICAL FIELD

The present disclosure generally relates to web analytics, and more particularly to estimating a count of network users.

BACKGROUND

The internet is a powerful tool for content providers to reach out to a large audience. The internet provides powerful targeted content provision methods such as contextual targeting, behavioral targeting, lifestyle targeting, demographic targeting, geographic targeting and the like. Much like other media, the internet content provision industry relies on a unique user statistic to measure the true size of the audience of a website. The unique user statistic is one describing a unit of traffic to a website in a predefined time frame, for instance one week, one month, and so forth.

One way to measure the unique user statistic is through use of internet usage surveys such as those conducted by comScore Inc., and Nielsen Online. Because such surveys use panels of web users to gather data and then extrapolate, the results are estimates. Typically, surveys are restricted to smaller geographical areas, such as a single country. Therefore, surveys may not present an accurate statistic for international audiences. Particularly for websites and web applications having a small target audience, and small geographical areas, panel data is sparsely available, or not available at all. This makes the extrapolated and estimated unique user statistic unreliable.

Another method to measure the unique user statistic is through the use of registration. Users may be required to register for web sites, and may be granted access to the website only by signing-in. However, users may not always register for web sites, and may instead opt to use another web site not requiring registration. Further, many users may create several user accounts. For instance, users may create different user accounts for business use and for personal use.

Yet another method to measure the unique user statistic is by the use of cookies. A web server hosting the web site may place a cookie on the client computer of each visitor. The web server may then count the number of unique users by checking for the cookie each time a user visits the web site. However, users may often clear their cookies. This may result in inflated statistics. Further, multiple users may often share client computers to access the internet. In such a scenario, multiple users may use the same cookie, thus resulting in deflated statistics.

Therefore, there is a need for a method for addressing these and other shortcomings associated with counting the number of network users.

SUMMARY

In particular embodiments, the present invention provides methods, systems and computer program products for determining a count of network users. One method identifies one or more login access requests, from one or more server logs. Each of the one or more login access requests comprises a login cookie, and a user identifier. The method then forms one or more connected components based on the one or more login access requests. Each connected component comprises one or more user identifiers, wherein each of the one or more user identifiers is associated with one or more login cookies. The method finally determines a count of login users based, at least in part, on the user identifiers in the one or more connected components.

In another example embodiment, the method may further identify one or more non-login access requests from one or more server logs. Each of the one or more non-login access requests comprising a non-login cookie. The method identifies login cookies in the one or more connected components, matching the non-login cookies. The method then identifies one or more user identifiers associated with the matching login cookies. Finally, the method determines a count of non-login users based on the identified user identifiers.

In one example embodiment, the method may further identify one or more unregistered access requests from the one or more server logs. Each of the one or more unregistered access requests comprises an unregistered cookie. The method identifies one or more unique unregistered cookies based on at least one of an IP address, and a user agent data in the unregistered access requests. The method then estimates a count of browsers based on the unique unregistered cookies. Finally, the method determines a count of unregistered users based, at least in part, on the count of browsers.

In various embodiments, the method may further determine a count of unique users as the total of the counts of login users, non-login users, and unregistered users.

BRIEF DESCRIPTION OF THE DRAWINGS

The features and advantages of various embodiments of the present invention will become more apparent from the detailed description set forth below when taken in conjunction with the drawings in which like reference numbers indicate identical or functionally similar elements.

DESCRIPTION OF EXAMPLE EMBODIMENTS

Various embodiments of the present invention will be described in detail below with reference to accompanying drawings. It will be apparent, however, that these embodiments may be practiced without some or all of these specific details. In other instances, well known process steps or elements have not been described in detail in order not to unnecessarily obscure the description of the invention. The following example embodiments and their aspects are described and illustrated in conjunction with apparatuses, methods, and systems which are meant to be illustrative examples, not limiting in scope.

Example Network Environment

Figure 1:
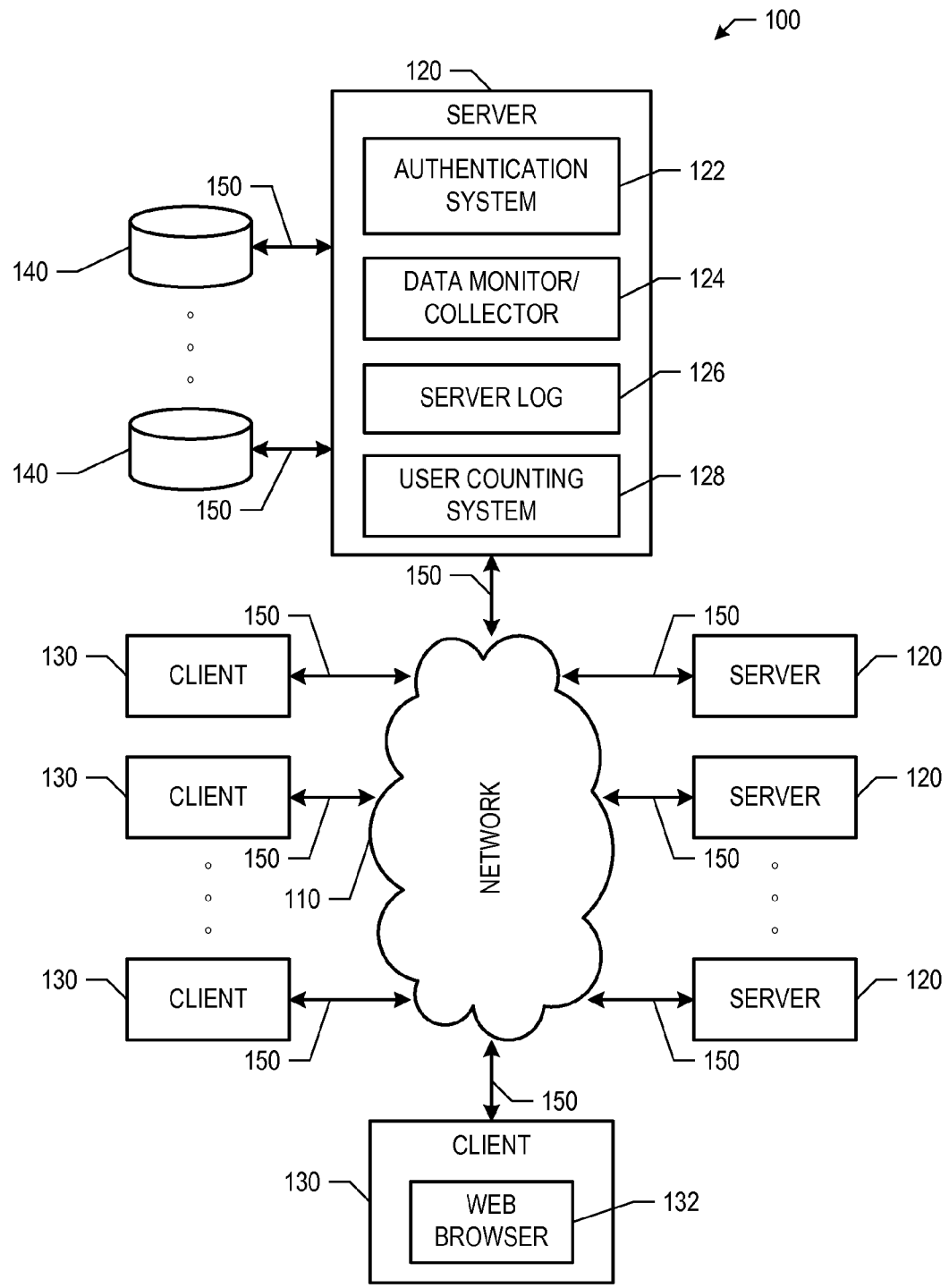
FIG. 1 illustrates an example network environment in which particular implementations may operate.

Particular embodiments may be implemented in a network environment. FIG. 1 illustrates an example network environment 100. Network environment 100 includes a network 110 coupling one or more servers 120 and one or more clients 130 to each other. In particular embodiments, network 130 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 110 or a combination of two or more such networks 110. The present disclosure contemplates any suitable network 110.

One or more links 150 couple servers 120 or clients 130 to network 110. In particular embodiments, one or more links 150 each includes one or more wired, wireless, or optical links 150. In particular embodiments, one or more links 150 each includes an intranet, an extranet, a VPN, a LAN, a WLAN, a WAN, a MAN, a communications network, a satellite network, a portion of the Internet, or another link 150 or a combination of two or more such links 150. The present disclosure contemplates any suitable links 150 coupling servers 120 and clients 130 to network 110.

In particular embodiments, each server 120 may be a unitary server or may be a distributed server spanning multiple computers or multiple datacenters. Servers 120 may be of various types, such as, for example and without limitation, web server, news server, mail server, message server, advertising server, file server, application server, exchange server, database server, or proxy server. In particular embodiments, each server 120 may include hardware, software, or embedded logic components or a combination of two or more such components for carrying out the appropriate functionalities implemented or supported by server 120. For example, a web server is generally capable of hosting websites containing web pages or particular elements of web pages. More specifically, a web server may host HTML files or other file types, or may dynamically create or constitute files upon a request, and communicate them to clients 130 in response to HTTP or other requests from clients 130. A mail server is generally capable of providing electronic mail services to various clients 130. A database server is generally capable of providing an interface for managing data stored in one or more data stores.

Servers 120 may uniquely identify each browser that sends a request for content to server 120 using cookies. Servers 120 may check each access request for a cookie. For each access request that does not contain the cookie, server 120 may generate a cookie, and transmit the cookie to the requesting browser. The cookie typically includes a globally unique identifier generated by server 120. In an example implementation server 120 may use a pseudo-random number generator to generate the globally unique identifier. The cookie may be a persistent cookie. For every subsequent request for accessing the network based service, the browser includes the cookie in the access request. Further, server 120 may send separate cookies for different network based services, such as, news, social networking, stocks and finance, email, and so forth. In an example implementation, the cookie may include an encrypted user identifier for improved security. Such an encrypted user identifier may only be decrypted by server 120.

In particular embodiments, each client 130 may be an electronic device including hardware, software, or embedded logic components or a combination of two or more such components and capable of carrying out the appropriate functionalities implemented or supported by client 130. For example and without limitation, a client 130 may be a desktop computer system, a notebook computer system, a netbook computer system, a handheld electronic device, or a mobile telephone. A client 130 may enable a network user at client 130 to access network 110. A client 130 may have a web browser, such as Microsoft Internet Explorer or Mozilla Firefox, and may have one or more add-ons, plug-ins, or other extensions, such as Google Toolbar or Yahoo Toolbar. Client 130 may have a cookie store associated with each web browser, to store cookies issued by servers 120. When requesting access to network based services, client 130 may send the cookie to server 120 along with the access request. A client 130 may enable its user to communicate with other users at other clients 130. The present disclosure contemplates any suitable clients 130.

In particular embodiments, one or more data storages 140 may be communicatively linked to one or more servers 120 via one or more links 150. In particular embodiments, data storages 140 may be used to store various types of information. In particular embodiments, the information stored in data storages 140 may be organized according to specific data structures. For instance, data storage 140 stores information about the user identifiers used by the existing users of the network application(s) hosted by the network based service provider. Data storage 140 may also include other information such as, but not limited to, user profile information, and user behavioral information. User profile information may include the user's personal information such as city of residence, zip code, age, gender, personal interests, and so forth. User behavioral information includes the user's navigation information such as, network based services frequently access by the user, average duration of visit at the network based services, time of visit for the network based services, type of content accessed, and so forth.

Particular embodiments may provide interfaces that enable servers 120 or clients 130 to manage (e.g., retrieve, modify, add, or delete) the information stored in data storage 140. Data storage 140 may be implemented using any known database solution such as a Relational Database Management System (RDBMS), an Extensible Markup Language (XML) database, a flat file database, and the like.

In particular embodiments, a server 120 may include an authentication system 122. Authentication system 122 may include hardware, software, or embedded logic components or a combination of two or more such components for carrying out the appropriate functionalities implemented or supported by authentication system 122. For example and without limitation, authentication system 122 may implement one or more algorithms to register new users to the network based services, and authenticate existing users at sign-in. At registration, authentication system 122 creates a user account and stores a user identifier such as, but not limited to, a username, a screen name, an email address, an open ID Uniform Resource Locator (URL), an alias name and so on, in the data storage 140. The users may then use the user identifier to access the user account. Authentication system 122 may use security protocols such as Secure Sockets Layer (SSL), Transport Layer Security (TLS) or GnuTLS to authenticate users at sign-in.

In particular embodiments, a server 120 may also include a data monitor/collector 124. Data monitor/collection 124 may include hardware, software, or embedded logic components or a combination of two or more such components for carrying out the appropriate functionalities implemented or supported by data monitor/collector 124. For example and without limitation, data monitor/collector 124 may monitor and collect network traffic data at server 120 and store the collected network traffic data in one or more server logs 126. Servers 120 may maintain a common server log 126 for all network based services hosted by the network based service provider. Alternatively, servers 120 may maintain separate server logs 126 for the different network based services. Further, in one implementation, each server 120 maintains a server log 126. In another implementation, the network based service provider may maintain a global server log for all servers 120. Server log 126 may be implemented using any known server log format such as the Common Log Format, the Combined Log Format, the Extended Log Format, and so forth. Alternatively, server log 126 may be implemented using a proprietary log file format. Server logs 126 may also include fields such as, but not limited to, a user identifier, a cookie, an IP address of client 130 requesting access, the date, time, and time zone when server 120 finishes processing the request, a request line from client 130, an HTTP status code returned to client 130, a size of the content returned to the client, a referrer URL, and a user agent identifier for identifying the web browser, and the operating system on client 130. Server logs 126 may be employed by user counting system 128 to count the number of unique users visiting various network based services. The structure and function of user counting system 128 is described in the following paragraphs.

When a registered user logs in to a network based service, client 130 of the registered user sends an access request including the cookie and the user identifier to server 120. Server 120 authenticates the user identifier and password with the authentication system 122, and grants access to the user on successful authentication. Server 120 then stores the user identifier and the cookie in server log 126. On the other hand, when a registered user access a network based service without logging in, client 130 of the registered user sends an access request including the cookie, but not the user identifier. For such a request, server 120 stores the cookie in server log 126, and leaves the user identifier field blank. Also, when an unregistered user accesses a network based service, client 130 of the unregistered user sends an access request including the cookie, but not the user identifier. For such a request, server 120 stores the cookie in server log 126, and leaves the user identifier field blank.

For the purpose of clarity of description in the present application, the cookies associated with registered and logged in users are referred to herein as login cookies. The cookies associated with registered users that are not logged in, are referred to herein as non-login cookies. The cookies associated with unregistered users are referred to herein as unregistered cookies. It will be appreciated that the login cookies, non-login cookies, and unregistered cookies may be identical in structure, function, and behavior.

In particular embodiments, a server 120 may also include a user counting system 128. User counting system 128 may include hardware, software, or embedded logic components or a combination of two or more such components for carrying out the appropriate functionalities implemented or supported by user counting system 128. User counting system 128 estimates the count of unique users visiting various network based services hosted by the network based service provider. User counting system 128 estimates the count of unique users based on the access requests in server logs 126. Typically, the users accessing the network based services may be classified as registered users, and non-registered users. The registered users may further be classified as registered and logged in users, and registered but logged out users. User counting system 128 estimates a count of unique users based on a count of the registered and logged in users, a count of the registered but logged out users, and a count of the non-registered users.

Figure 2:
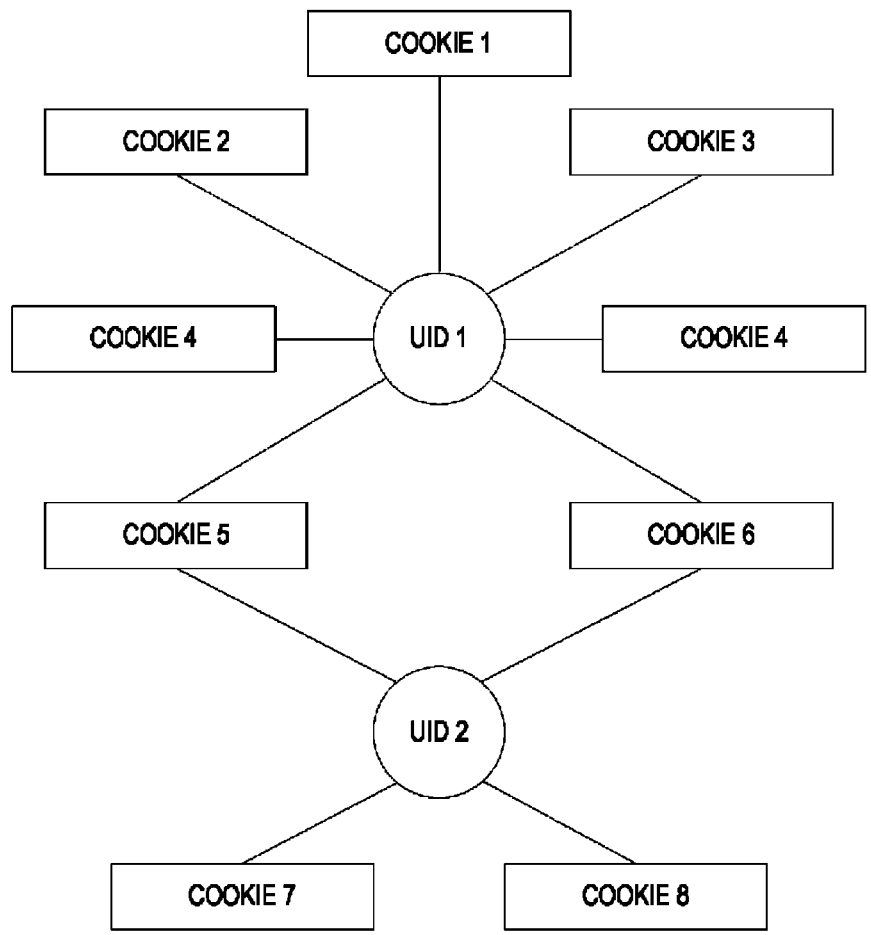
FIG. 2 illustrates an example connected component according to one embodiment.

User counting system 128 accesses server logs 126 to identify the access requests including the user identifier, and the login cookie. User counting system 128 forms one or more connected components of user identifiers and the login cookies. Each connected component includes a user identifier identified from the login access request. The login cookies received from clients 130 from which the user logs in to the network based service are associated with the user identifier. The connected component may include more than one user identifier. For instance, if more than one user share a client 130, and log in to the network based service using the same web browser, the users may have a common login cookie. Such a connected component includes more than one user identifier, wherein two or more user identifiers may share the common login cookie. FIG. 2 illustrates an example connected component according to one embodiment. User counting system 128 may then determine a count of unique login users, based on the user identifiers in the connected components. An example process of determining the count of login users is described in conjunction with FIG. 3.

Further, user counting system 128 may also count the number of non-login users. User counting system 128 accesses server logs 126 to identify the access requests including a non-login cookie, but having a blank user identifier field. User counting system 128 then searches the connected components for login cookies matching the non-login cookies. User counting system 128 then determines a count of unique non-login users based on the user identifiers in the connected components including the matching login cookie identifier. An example process of determining the count of non-login users is described in conjunction with FIG. 4.

As described earlier, access requests received from the non-registered users may not include the user identifier. Further, the unregistered cookie in the access requests received from the unregistered users may not match any login cookie in any of the connected components. User counting system 128 identifies the access requests including unregistered cookies which do not have a matching login cookie in any of the connected components. User counting system 128 then de-duplicates the unregistered cookies from the identified access requests, based on commonalities in the unregistered cookies, the IP address of the requesting client 130, and the user agent information. An example process of counting the unregistered users is described in conjunction with FIG. 5.

Counting Registered and Logged in Users

Figure 3:
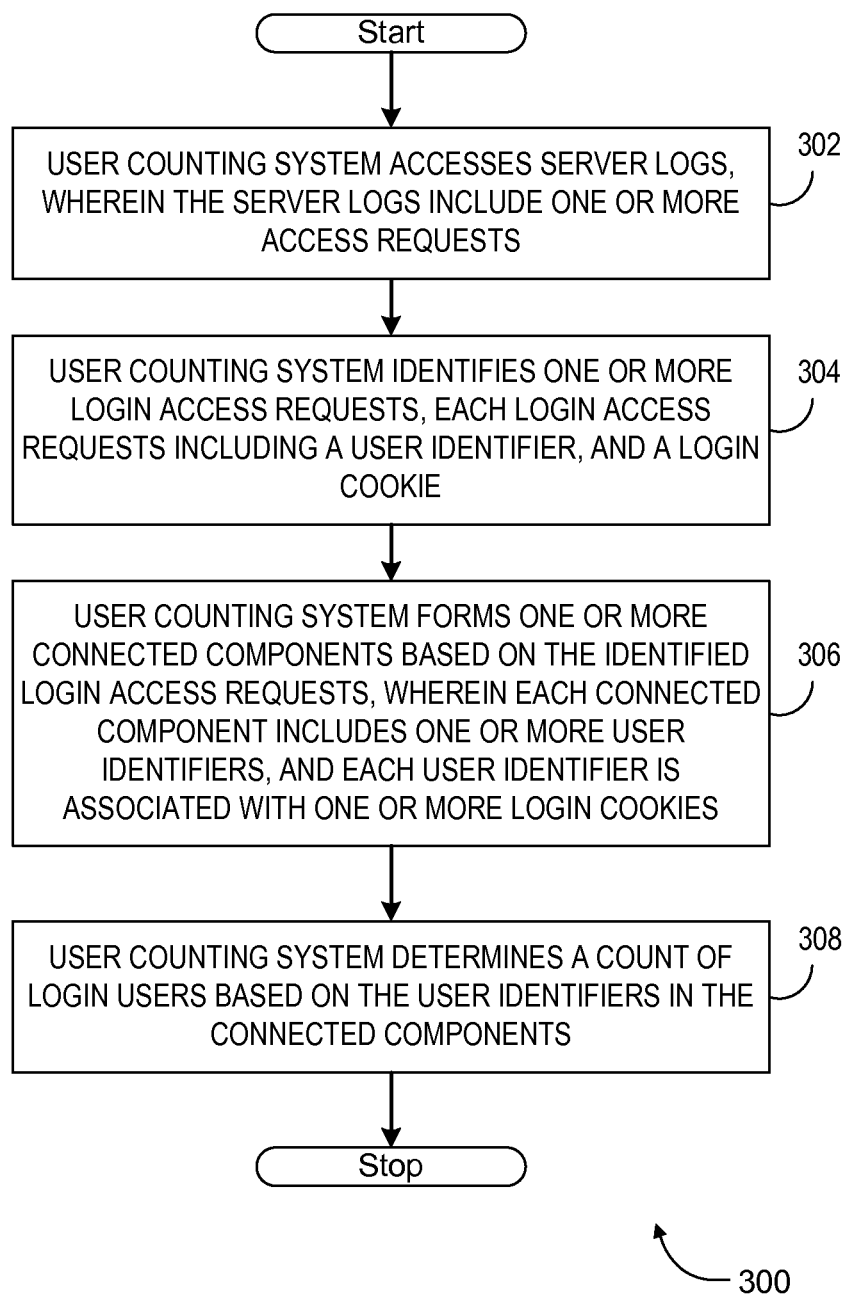
FIG. 3 is a flowchart illustrating an example method for estimating count of login users, according to one embodiment.

FIG. 3 is a flowchart illustrating an example process 300 for counting registered and logged in users, according to one embodiment.

At step 302, user counting system 128 accesses server logs 108. Server logs 108 include access requests sent by clients 130. Each access request includes fields such as, but not limited to, a user identifier, a cookie, an IP address of client 130 requesting access, the date, time, and time zone when server 120 finishes processing the request, a request line from client 130, a HTTP status code returned to client 130, a size of the content returned to the client, a referrer URL, and a user agent identifier for identifying the web browser, and the operating system on client 130.

At step 304, user counting system 128 identifies one or more login access requests. Each login access requests includes a user identifier, and a login cookie. Counting system 128 differentiates between login access requests and other access requests by checking the user identifier and cookie fields of the access requests in server logs 108. Counting system 128 identifies the access requests including a user identifier and a login cookie as login access requests. The user identifier field in non-login access requests and unregistered access requests is typically blank.

At step 306, user counting system 128 forms one or more connected components based on the identified login access requests. Each connected component includes a user identifier, and all the login cookies associated with the user identifier. Each connected component represents a set of browsers and clients 130 used to access the network based service using the unique user identifier. For instance, USER-1 may log in to the network based service using his user identifier UID-1, from a mobile phone, a home computer, and a work computer (i.e. multiple clients 130). Further, USER-1 may use browser B-1 on the cell phone and the work computer, and browsers B-1 and B-2 on the home computer. It is known that each distinct browser, whether on the same client 130, or on different clients 130, stores a distinct cookie. Therefore, a connected component related to USER-1 represents browser B-1 on the cell phone, browsers B-1 and B-2 on the home computer, and browser B-1 on the work computer, used to access the network based services using UID-1. Further, users may periodically delete the cookies stored in the browser storage. Therefore, login access requests received from the same browser on the same client 130, at different times may have different login cookies associated with the same user identifier. Often, the connected component may include more than one user identifier. For instance, if more than one user share a client 130, and log in to the network based service using the same web browser, the users may have a common login cookie. Such a connected component includes more than one user identifier, wherein two or more user identifiers may share the common login cookie. FIG. 2 illustrates an example connected component according to one embodiment. As seen in FIG. 2, a connected component may be viewed as a network including one or more user identifiers as primary nodes, and one or more login cookies as secondary nodes connected to at least one of the primary nodes by edges.

In one embodiment, user counting system 128 forms the one or more connected components by processing the login access requests one at a time, in a sequential manner. User counting system 128 initiates with a first login access request including a first login cookie and a first user identifier. User counting system 128 forms a first connected component including the first login cookie associated with the first user identifier. For each preceding login access request in server logs 108, user counting system 128 checks if the preceding login access request includes a user identifier matching the first user identifier in the first connected component, or whether the preceding login access request includes a login cookie matching the first login cookie in the first connected component. If the user identifier in the preceding login access request matches the first user identifier, user counting system 128 associates the login cookie in the preceding login request with the first user identifier in the first connected component. On the other hand, if the login cookie in the preceding login access request matches the first login cookie, user counting system 128 associates the user identifier in the preceding login request with the first login cookie in the first connected component. If user counting system 128 a preceding login access request that includes a user identifier that does not match the first user identifier, and a login cookie that does not match the first login cookie, user counting system 128 forms a new connected component. The new connected component includes the login cookie of the preceding login access request associated with the user identifier for the preceding login access request.

At step 308, user counting system 128 determines a count of login users based on the user identifiers in the connected components. In one embodiment, user counting system 128 directly counts the number of user identifiers in each connected component. User counting system 128 then determines the count of login users as the sum of the user identifiers in each connected component.

Sometimes, a user may create multiple user accounts with the network based service provider. For instance, the user may have separate user accounts for business use and for personal use. The user may also have separate user accounts for different network based services such as email, stocks and finance, shopping, and so forth. Typically, users with multiple user accounts may have similar user profiles, or similar website viewing behavior, or both. User counting system 128 forms one or more clusters of user identifiers for each of the connected components. User counting system 128 forms the clusters of user identifiers based on parameters such as, but not limited to, user profile information, and user behavioral information. For instance, user counting system 128 may form a cluster of all user identifiers that access the sports car section on a classifieds website, or a cluster of all user identifiers having the same locality of residence in the associated profile information, or a cluster of all user identifiers accessing the stocks and finance portal between 9 AM and 12 PM on weekdays, and so on. User counting system 128 then counts the clusters for each connected component, and determines the count of login users as the sum of the clusters in each connected component. Forming clusters of user identifiers for each connected component may aid in identifying users having multiple accounts as a single human rather than falsely identifying them as distinct users. Therefore, forming clusters of user identifiers, and then counting the clusters may improve accuracy of the count of login users.

Further, in some scenarios, multiple users may share a user account. In such scenarios, multiple human users may be identified as a single login user. User counting system 128 may employ a bias ratio to scale the count of user identifiers, and thus determine a count of login users. User counting system 128 determines a count of the user identifiers in each of the one or more connected components. User counting system 128 then scales the count of user identifiers based on the bias ratio. User counting system 128 then determines the count of login users as a sum of the bias ratio scaled count of user identifiers. User counting system 128 may accept the bias ratios as input from another system or a technician. The bias ratio may be determined using statistical methods based on internet usage survey data. In one example embodiment, the bias ratio is a function of the number of user identifiers in the connected component.

Counting Registered and Logged Out Users

Figure 4:
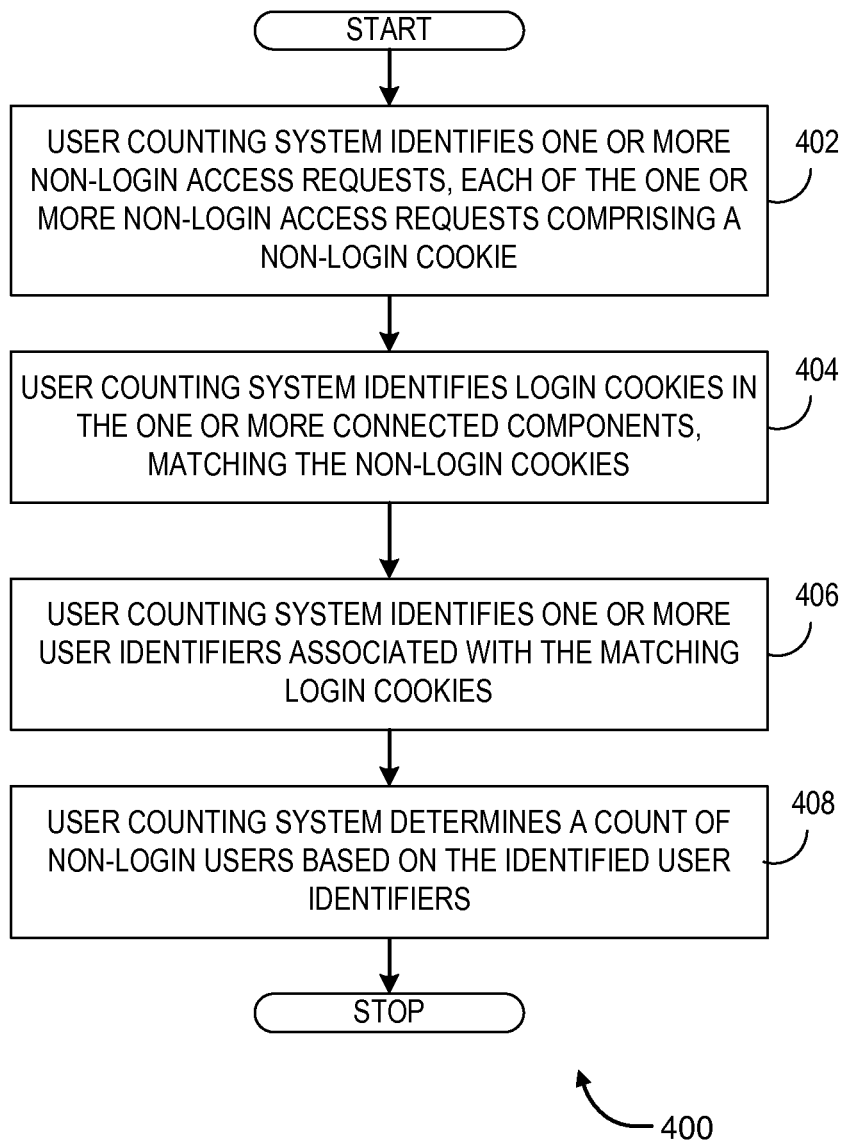
FIG. 4 is a flowchart illustrating an example method for estimating count of non-login users, according to one embodiment.

FIG. 4 is a flowchart illustrating an example process 400 for counting registered and logged out users, according to one embodiment.

At step 402, user counting system 128 identifies one or more non-login access requests. Each non-login access requests includes a non-login cookie. However, for the non-login requests, the user identifier field is blank. Counting system 128 identifies non-login access requests by checking the user identifier field of the access requests in server logs 108. Counting system 128 identifies the access requests including a non-login cookie but having a blank user identifier field, as non-login access requests.

At step 404, user counting system 128 identifiers login cookies in the one or more connected components matching the non-login cookies. User counting system 128 may search the connected components to identify connected components including login cookies that match the non-login cookies.

At step 406, user counting system 128 identifies one or more user identifiers associated with the matching login cookies. Based on positive matches resulting in searches, user counting system 128 may identify the user identifiers associated with the login cookies that matches the non-login cookies.

At step 408, user counting system 128 determines a count of non-login users based on the identified user identifiers. In one example embodiment, user counting system 128 may directly count the number of identified user identifiers in each connected component, and determine the count of non-login users as the sum of the identified user identifiers in all connected components. Similar to the process 300 of counting login users, user counting system 128 may use a bias ratio to scale the count of user identifiers to determine the count of non-login users.

Counting Unregistered Users

Figure 5:
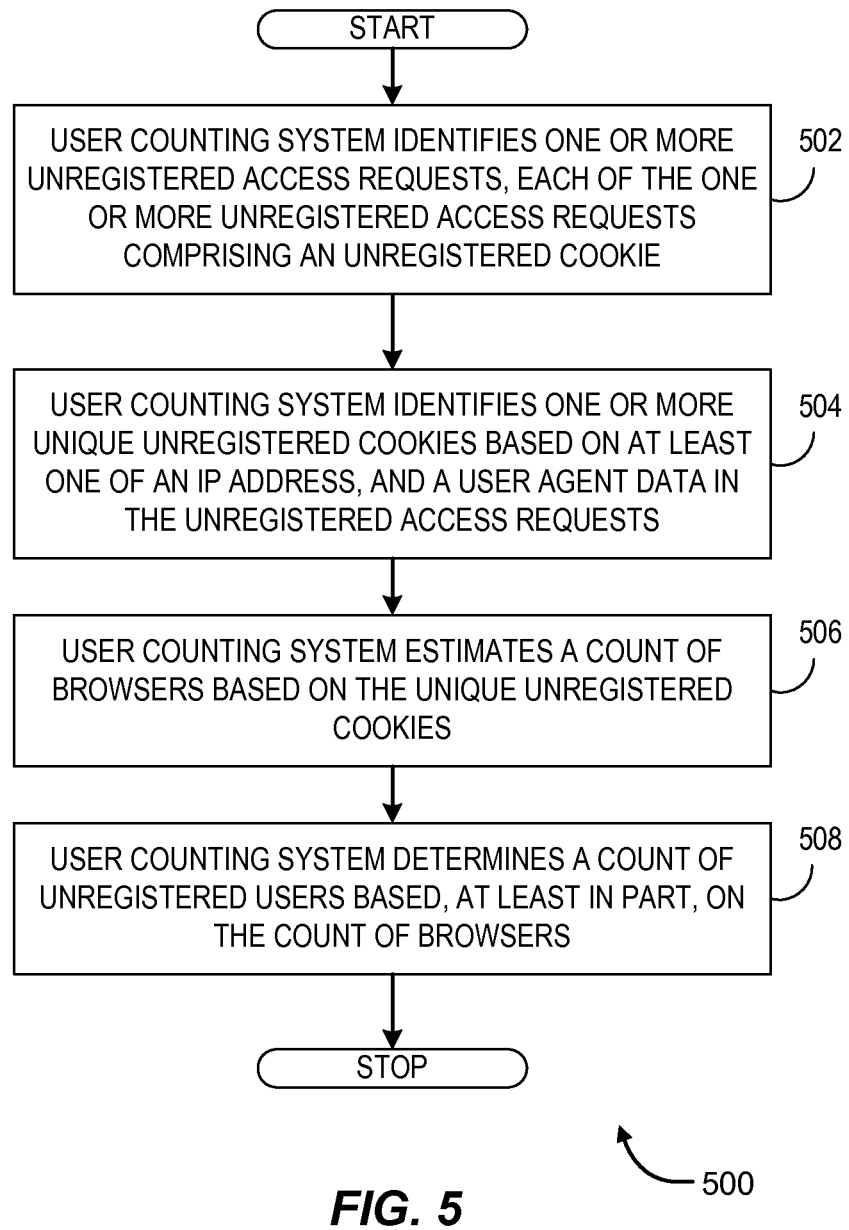
FIG. 5 is a flowchart illustrating an example method for estimating count of unregistered users, according to one embodiment.

FIG. 5 is a flowchart illustrating an example process 600 for counting un-registered users, according to one embodiment.

At step 502, user counting system 128 identifies one or more unregistered access requests, each of the one or more unregistered access requests comprising an unregistered cookie. In one embodiment, user counting system 128 identifies all access requests that do not include a user identifier, and do not include a cookie that matches with any login cookie, as unregistered access requests. The unregistered access requests include an unregistered cookie.

At step 504, user counting system 128 identifies unique unregistered cookies based on the one or more unregistered access requests. User counting system 128 may access behavioral information associated with each unregistered cookie. The behavioral information associated with the unregistered cookies may be stored in an anonymous user behavioral data store. User counting system 128 may identify unique unregistered cookies based on the behavioral information associated with each unregistered cookie. User counting system 128 may also employ other parameters, such as the IP address in the unregistered request, and the user agent information in the unregistered request, to identify the unique unregistered cookies.

At step 506, user counting system 128 estimates a count of browsers based on the unique unregistered cookies. User counting system 128 may directly use a count of the unique unregistered cookies as the count of browsers. However, any other known statistical technique may be used to estimate the count of browsers based on the count of unique unregistered cookies.

At step 508, user counting system 128 determines a count of unregistered users based on the count of browsers. User counting system 128 may user a ratio of browsers per user to determine the count of unregistered users. In one example embodiment, the ratio of browsers per user may be obtained from data of internet usage surveys such as those conducted by ComScore, Inc. and Compete.com. In another embodiment, the ratio of browsers per user may be computed using the login access requests and the non-login access requests. For instance, a system may determine the count of browsers used by all registered users, based on information such as the IP address in the access request, and the user agent information in the access request. User counting system 128 may then use the computed ratio to determine the count of unregistered users based on the count of browsers. In particular embodiments, user counting system 128 may use a trained model to estimate the number of browsers from the count of unregistered cookies.

The model may be trained used identifiers with longer persistence than cookies—such as a unique toolbar identifier. Often, users may install a toolbar issued by the network based service provider, for instance Yahoo! Toolbar issued by Yahoo! Inc. The toolbar may provide basic functionality to access the network based services such as search, email, news, user profile manager, and so forth. During installation, the network based service provider assigns a unique toolbar identifier to each toolbar installation. The unique toolbar identifier may be stored in the registry of client 130, thus making the unique toolbar identifier persistent. Each time the user accesses the network based services, the web browser 132 sends the unique toolbar identifier along with the access request. For a particular network based service, in a predetermined time span, user counting system 128 may obtain the count of unregistered cookies, the count of unique toolbar identifiers, and determine the age of the unregistered cookies from the access requests. User counting system 128 may then use suitable statistical techniques to determine an age distribution of the unregistered cookies based on the age of the unregistered cookies. User counting system 128 may then use a suitable statistical technique, for instance the Poisson distribution, to train the model based on the count of unregistered cookies, the count of unique toolbar identifiers, and the age-distribution feature of the unregistered cookies. User counting system 128 may then use the trained model to estimate a count of browsers based on the count of unregistered cookies. User counting system 128 may periodically re-train the model as per the system requirements.

In one embodiment, user counting system 128 computes the unique user statistic as a sum of the count of login users, the count of non-login users, and the count of unregistered users.

In the embodiments presented herein, user counting system 128 determines the count of unique users based on cookies and user identifiers. In various other embodiments, a hashing module may generate a hash value for cookies and user identifiers included in the access requests. In such embodiments, the server logs 108 may store modified versions of the access requests, including the hash values of the cookies in place of the cookies, and the hash values of the user identifiers in place of the user identifiers. Storing hash values may be computationally efficient, and may improve security of user information.

The unique user statistic may be employed to determine the true size of the audience of a network based service. Internet marketers may employ the unique user statistic to identify the number of unique users visiting the marketer's websites. Network based service providers may identify which of the network based services have a larger reach, and set prices for advertising space accordingly. Mobile operators may employ the unique user statistic to identify the network based services that the majority of subscribers access using their mobile devices. Mobile operators may then deploy faster proxy servers for such network based services. Social networking service providers may employ the unique user statistic for providing recommendations to users. For instance, the social networking service providers may indicate communities having large audiences, and recommend those communities to users, in addition to the existing recommendation methods.

Example Hardware System Architecture

Figure 6:
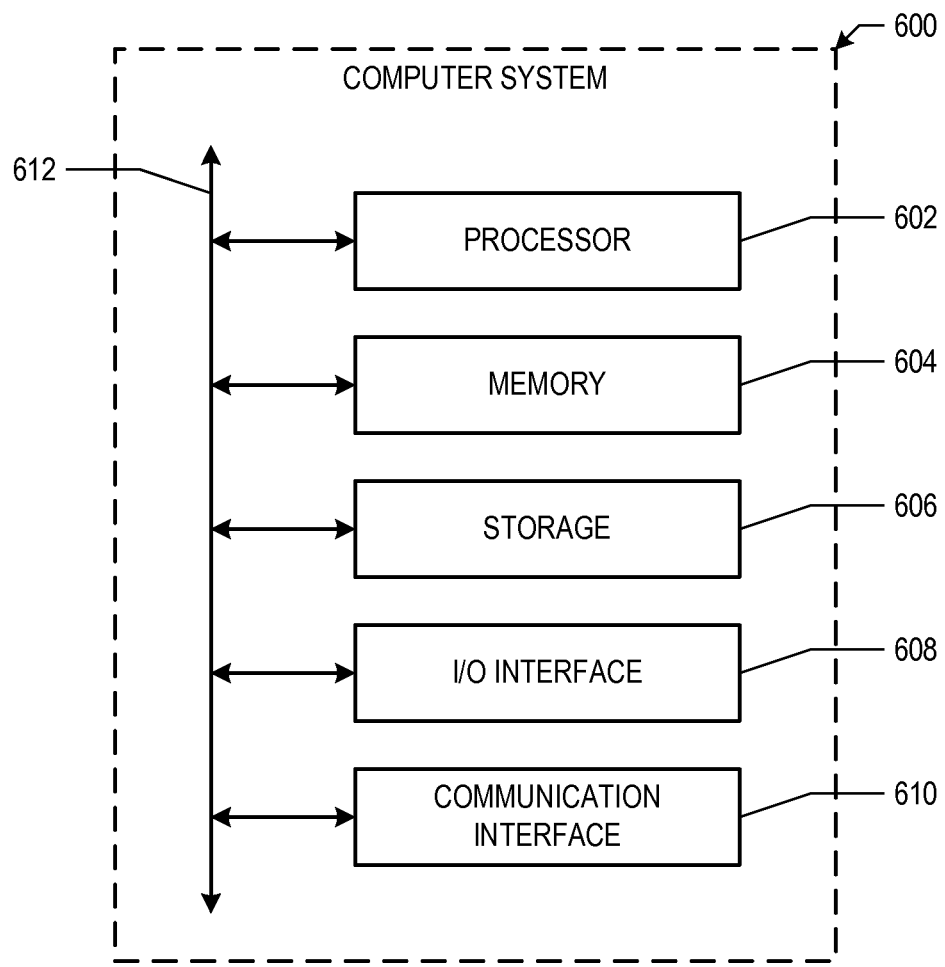
FIG. 6 is a schematic diagram illustrating an example computing system for estimating count of network users, according to one embodiment.

Particular embodiments may be implemented on one or more computer systems. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnects.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method comprising: by one or more computing devices,
identifying one or more login access requests of one or more registered users from one or more server logs, individual ones of the one or more login access requests comprising a login cookie and one user identifier;
forming one or more connected components based on the one or more login access requests, wherein individual ones of the one or more connected components comprise one or more user identifiers, individual ones of the one or more user identifiers being associated with one or more login cookies, wherein at least one of the one or more login cookies is associated with at least two different user identifiers;
identifying one or more non-login access requests of registered users from the one or more server logs, individual ones of the one or more non-login access requests comprising a non-login cookie without a user identifier, wherein a non-login access request of a registered user is identified based at least in part on the non-login cookie being substantially identical to a first login cookie of the one or more connected components; and
determining a count of registered users based, at least in part, on the user identifiers in the one or more connected components.

2. The method of claim 1, wherein forming the one or more connected components comprises:
forming a first connected component including a first cookie of a first login access request associated with a first user identifier of the first login access request;
associating a second cookie of a second login access request with the first user identifier in the first connected component in response to a second user identifier of the second login access request matching the first user identifier;
associating the second user identifier with the first cookie in the first connected component in response to the second cookie matching the first cookie;
forming a second connected component including the second cookie associated with the second user identifier in response to the second user identifier or the second cookie not matching the first user identifier or the first cookie.

3. A method comprising: by one or more computing devices,
identifying one or more login access requests from one or more server logs, individual ones of the one or more login access requests comprising a login cookie and one user identifier;
forming one or more connected components based on the one or more login access requests, wherein individual ones of the one or more connected components comprise one or more user identifiers, individual ones of the one or more user identifiers being associated with one or more login cookies, wherein at least one of the one or more login cookies is associated with at least two different user identifiers; and
determining a count of login users based, at least in part, on the user identifiers in the one or more connected components, wherein determining the count of login users further comprises:
for individual ones of the one or more connected components, determining a count of the user identifiers;
for individual ones of the one or more connected components, scaling the count of user identifiers based on a bias ratio; and
computing a sum of the scaled counts of user identifiers.

4. The method of claim 1, wherein determining the count of login users further comprises:
for individual ones of the one or more connected components, forming one or more clusters of user identifiers based on at least one of a user profile information associated with the user identifiers and user behavioral information associated with the user identifiers; and
evaluating the count of login users based on a count of the clusters.

5. The method of claim 1 further comprising:
identifying one or more non-login access requests from one or more server logs, each of the one or more non-login access requests comprising a non-login cookie;
identifying login cookies in the one or more connected components, matching the non-login cookies;
identifying one or more user identifiers associated with the matching login cookies; and
determining a count of non-login users based on the identified user identifiers.

6. The method of claim 1 further comprising:
identifying one or more unregistered access requests from the one or more server logs, each of the one or more unregistered access requests comprising an unregistered cookie;
identifying one or more unique unregistered cookies based on at least one of an IP address, and a user agent data in the unregistered access requests;
estimating a count of browsers based on the unique unregistered cookies; and
determining a count of unregistered users based, at least in part, on the count of browsers.

7. The method of claim 1 further comprising:
determining a count of non-login users;
determining a count of unregistered users; and
computing a count of total unique users as a sum of the count of login users, the count of non-login users, and the count of unregistered users.

8. A system comprising:
a memory comprising instructions executable by one or more processors; and
the one or more processors coupled to the memory to execute the instructions to:
identify one or more login access requests of one or more registered users from one or more server logs, individual ones of the one or more login access requests comprising a login cookie and one user identifier;
form one or more connected components based on the one or more login access requests, wherein individual ones of the connected components comprise one or more user identifiers, individual ones of the one or more user identifiers being associated with one or more login cookies, wherein at least one of the one or more login cookies is associated with at least two different user identifiers;
identify one or more non-login access requests of registered users from the one or more server logs, individual ones of the one or more non-login access requests comprising a non-login cookie without a user identifier, wherein a non-login access request of a registered user to be identified based at least in part on the non-login cookie being substantially identical to a first login cookie of the one or more connected components; and
determine a count of registered users based, at least in part, on the user identifiers in the one or more connected components.

9. The system of claim 8, wherein the one or more processors are further capable of executing the instructions to:
form a first connected component including a first cookie of a first login access request associated with a first user identifier of the first login access request;
associate a second cookie of a second login access request with the first user identifier in the first connected component in response to a second user identifier of the second login access request matching the first user identifier;

associate the second user identifier with the first cookie in the first connected component in response to the second cookie matching the first cookie;

form a second connected component including the second cookie associated with the second user identifier in response to the second user identifier or the second cookie not matching the first user identifier or the first cookie.

10. A system of claim 8, comprising:

a memory comprising instructions executable by one or more processors; and the one or more processors coupled to the memory to execute the instructions to:

identify one or more login access requests from one or more server logs, individual ones of the one or more login access requests comprising a login cookie and one user identifier;

form one or more connected components based on the one or more login access requests, wherein individual ones of the connected components comprise one or more user identifiers, individual ones of the one or more user identifiers being associated with one or more login cookies, at least one of the one or more login cookies being associated with at least two different user identifiers; and determine a count of login users based, at least in part, on the user identifiers in the one or more connected components;

wherein the one or more processors are further capable of executing the instructions to:

for individual ones of the one or more connected components, determine a count of the user identifiers;

for individual ones of the one or more connected components, scale the count of user identifiers based on a bias ratio; and compute a sum of the scaled counts of user identifiers.

11. The system of claim 8, wherein the one or more processors are further capable of executing the instructions to:

for individual ones of the one or more connected components, form one or more clusters of user identifiers based on at least one of a user profile information to be associated with the user identifiers and a user behavioral information associated with the user identifiers; and evaluate the count of login users based on a count of the clusters.

12. The system of claim 8, wherein the one or more processors are further capable of executing the instructions to:

identify one or more non-login access requests, individual ones of the one or more non-login access requests comprising a non-login cookie;

identify login cookies in the one or more connected components matching the non-login cookies;

identify one or more user identifiers being associated with the matching login cookies; and determine a count of non-login users based on the identified user identifiers.

13. The system of claim 8, wherein the one or more processors are further capable of executing the instructions to:

identify one or more unregistered access requests, individual ones of the one or more unregistered access requests comprising an unregistered cookie;

identify one or more unique unregistered cookies based on at least one of an IP address and a user agent data in the unregistered access requests;

estimate a count of browsers based on the unique unregistered cookies; and determine a count of unregistered users based, at least in part, on the count of browsers.

14. The system of claim 8, wherein the one or more processors are further capable of executing the instructions to:

determine a count of non-login users;

determine a count of unregistered users; and compute a count of total unique users as a sum of the count of login users, the count of non-login users, and the count of unregistered users.

15. A non-transitory computer-readable medium comprising one or more storage media instructions executable by one or more computer systems to:

identify one or more login access requests of one or more registered users from one or more server logs, individual ones of the one or more login access requests comprising a login cookie and one user identifier;

form one or more connected components based on the one or more login access requests, wherein individual ones of the connected components comprise one or more user identifiers, individual ones of the one or more user identifiers being associated with one or more login cookies, wherein at least one of the one or more login cookies is associated with at least two different user identifiers;

identify one or more non-login access requests of registered users from the one or more server logs, individual ones of the one or more non-login access requests comprising a non-login cookie without a user identifier, wherein a non-login access request of a registered user is to be identified based at least in part on the non-login cookie being substantially identical to a first login cookie of the one or more connected components; and determine a count of registered users based, at least in part, on the user identifiers in the one or more connected components.

16. The computer-readable medium of claim 15, wherein the instructions are further executable by the one or more computer systems to:

form a first connected component including a first cookie of a first login access request being associated with a first user identifier of the first login access request;

associate a second cookie of a second login access request with the first user identifier in the first connected component in response to a second user identifier of the second login access request matching the first user identifier;

associate the second user identifier with the first cookie in the first connected component in response to the second cookie matching the first cookie;

form a second connected component including the second cookie associated with the second user identifier in response to the second user identifier or the second cookie not matching the first user identifier or the first cookie.

17. A non-transitory computer-readable medium comprising one or more media instructions executable by one or more computer systems to:

identify one or more login access requests from one or more server logs, individual ones of the one or more login access requests comprising a login cookie and one user identifier;

form one or more connected components based on the one or more login access requests, wherein individual ones of the connected components comprise one or more user identifiers, individual ones of the one or more user identifiers being associated with one or more login cookies, wherein at least one of the one or more login cookies is associated with at least two different user identifiers; and determine a count of login users based, at least in part, on the user identifiers in the one or more connected components;

wherein the instructions are further executable by the one or more computer systems to:

for individual ones of the one or more connected components, determine a count of the user identifiers;

for individual ones of the one or more connected components, scale the count of user identifiers based on a bias ratio; and compute a sum of the scaled counts of user identifiers.

18. The computer-readable medium of claim 15, wherein the instructions are further executable by the one or more computer systems to:

for individual ones of the one or more connected components, form one or more clusters of user identifiers based on at least one of a user profile information to be associated with the user identifiers and user behavioral information associated with the user identifiers; and evaluate the count of login users based on a count of the clusters.

19. The computer-readable medium of claim 15, wherein the instructions are further executable by the one or more computer systems to:

identify one or more non-login access requests, individual ones of the one or more non-login access requests comprising a non-login cookie;

identify login cookies in the one or more connected components to match the non-login cookies;

identify one or more user identifiers associated with the matching login cookies; and determine a count of non-login users based on the identified user identifiers.

20. The computer-readable medium of claim 15, wherein the instructions are further executable by the one or more computer systems to:

identify one or more unregistered access requests, individual ones of the one or more unregistered access requests comprising an unregistered cookie;

identify one or more unique unregistered cookies based on at least one of an IP address or a user agent data in the unregistered access requests;

estimate a count of browsers based on the unique unregistered cookies; and determine a count of unregistered users based, at least in part, on the count of browsers.

* * * * *